US008370310B2

(12) United States Patent
Dhamankar et al.

(10) Patent No.: US 8,370,310 B2
(45) Date of Patent: Feb. 5, 2013

(54) MANAGING DATABASE RECOVERY TIME

(75) Inventors: Robin Dhananjay Dhamankar, Bellevue, WA (US); Hanumantha Rao Kodavalla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/041,091

(22) Filed: Mar. 4, 2011

(65) Prior Publication Data

US 2012/0226668 A1 Sep. 6, 2012

(51) Int. Cl.
*G06F 15/16* (2006.01)
*G06F 17/20* (2006.01)
(52) U.S. Cl. ........................... 707/682; 707/683
(58) Field of Classification Search .................. 707/682, 707/683; 711/162
See application file for complete search history.

(56) References Cited

U.S. PATENT DOCUMENTS

| 5,043,866 | A | 8/1991 | Myre, Jr. | |
|---|---|---|---|---|
| 5,574,902 | A | 11/1996 | Josten | |
| 7,260,681 | B2 | 8/2007 | Lubbers | |
| 2006/0101083 | A1* | 5/2006 | Cherkauer et al. | 707/200 |
| 2008/0098157 | A1* | 4/2008 | Andrewartha et al. | 711/103 |
| 2008/0228833 | A1* | 9/2008 | Kano | 707/202 |

OTHER PUBLICATIONS

Jaluta, "B-tree Concurrency Control and Recovery in a Client-Server Database Management System," Helsinki University of Technology, Department of Computer Science and Engineering, Laboratory of Information Processing Science, Espoo 2002, pp. 1-115.
Lomet, "Recovery for Shared Disk Systems Using Multiple Redo Logs," Digital Equipment Corporation 1990, pp. 1-24.
Page, "Configuring Database Systems," Proceedings of the Twelfth Systems Administration Conference (LISA '98) Boston, Massachusetts, Dec. 6-11, 1998, pp. 1-13, http://www.usenix.org/event/lisa98/full_papers/page/page.pdf.
Bohannon et al., "Detection and Recovery Techniques for Database Corruption," IEEE Transactions on Knowledge and Data Engineering, vol. 15, No. 5, Sep./Oct. 2003.
Wang, "Checkpointing Virtual Machines Against Transient Errors," IEEE 16th International On-Line Testing Symposium, 2010, pp. 97-102.
Krayzman, "Development of self-tuning and autonomic databases and latest achievements," 21st Computer Science Seminar, Retrieved Dec. 14, 2010, pp. 1-8.
Stankovic, "Misconceptions About Real-Time Databases," IEEE, Jul. 2009, pp. 29-36.
Joshi, "Checkpointing in Oracle," Proceedings of the 24th VLDB Conference, New York, USA, Aug. 27, 1998, pp. 665-668.

* cited by examiner

*Primary Examiner* — John E Breene
*Assistant Examiner* — Alex Gofman
(74) *Attorney, Agent, or Firm* — Workman Nydegger

(57) ABSTRACT

Managing database recovery time. A method includes receiving user input specifying a target recovery time for a database. The method further includes determining an amount of time to read a data page of the database from persistent storage. The method further includes determining an amount of time to process a log record of the database to apply changes specified in the log record to a data page. The method further includes determining a number of dirty pages that presently would be read in recovery if a database failure occurred. The method further includes determining a number of log records that would be processed in recovery if a database failure occurred. The method further includes adjusting at least one of the number of dirty pages that presently would be read in recovery or the number of log records that would be processed in recovery to meet the specified target recovery time.

18 Claims, 2 Drawing Sheets

MANAGING DATABASE RECOVERY TIME

BACKGROUND

Background and Relevant Art

Computers and computing systems have affected nearly every aspect of modern living. Computers are generally involved in work, recreation, healthcare, transportation, entertainment, household management, etc.

Computing systems may be used to implement database systems. A database system typically stores information for use by other client computing systems. The database system allows different clients to access the database system, including performing such actions as reading data from the database system, writing data to the database system or updating data to the database system.

Because different client accesses can conflict with each other, database systems may implement transactional data handling functionality. For example, assume that a client accesses a database to transfer money from one account to another. The client will read information about a first account to determine the amount of funds in the first account. If the amount of funds are sufficient, the client will debit the first account by reducing the account balance of the first account by the amount to be transferred, in particular by replacing the balance of the first account with a reduced balance. The client will then (or at the same or an overlapping time) access a second account and read the balance of the second account. The client can credit the amount to be transferred by adding the amount to be transferred to the balance in the second account and writing that sum to the database as the balance of the second account. If a second client is able to access the account balances while the first client is performing the transfer, the second client may read information that is outdated, or may write data which may be later overwritten by the first client or which may cause problems with the transfer transaction.

To combat this, database systems use various types of transactional computing. For example, in some examples, databases use optimistic transactions. In these transactions, the database assumes that other systems will not interfere with the transaction. If the transaction is interfered with, the database has stored values that existed before the transaction was begun and can use the stored values to abort the transaction and return affected database elements to the state they were in before the transaction was begun. In particular, the database system will store an old version of data and a new version of data. When changes are made durable or the transaction is committed, the new version of data becomes the present state of the database. If a transaction is aborted, the old version of the data remains the present state of the database.

A database will often have in memory versions of database items along with persistently stored versions of database items stored in persistent storage, such as on hard disks. The in memory versions may be stored in a buffer pool. When items in a database are being operated on, they are typically operated in using the in memory copy. For example, a database item can be read from persistent storage, such as a hard disk, into memory, such as system RAM and/or processor cache. A computing system can then access the database to read the database item, which will be provided to the computing system from the in memory copy. The computing system can modify the database item, which results in an in memory modification. Pages in the buffer pool that have had changes applied to them, which have not been persisted to the persistent storage, may be referred to herein as dirty pages.

Typically the changes to database items are typically made or memorialized in a transaction log. The transaction log can be used to restore a database when a database failure occurs and/or the database is found to be inconsistent. In particular, the transaction log can be used to reapply changes for transactions that have committed and to roll back changes from transactions that may be in process, but not committed when the inconsistency is discovered. The transaction log includes various log records. Each log record is associated with a database page and includes changes to the database page. Often when a database is found to be inconsistent, the inconsistency is resolved using the data of the database in persistent storage. Thus, to resolve the inconsistency, a data page is read from persistent storage, stored in memory, and changes are applied from the transaction log.

Restoration of a database can be optimized by periodically writing log record changes to persistent storage. In particular, a log record can be processed by reading into memory a data page for the log record, making the changes to the data page identified in the log record, and writing the data page back to persistent storage. The log records are typically identified by a log sequence number (LSN). The LSN is often a monotonically increasing number such that is can be readily determined in what order a log record was created.

Periodically writing log record changes to persistent storage is typically done in conjunction with setting checkpoints. Checkpoints represent points in time, and can be associated with LSNs. A checkpoint can be set and an LSN can be associated with the checkpoint. The system then begins updating database pages beginning with an oldest LSN and working forward to the LSN associated with the newly set checkpoint. A system can be assured that all log records prior to the next most recently set checkpoint (i.e. the checkpoint set prior to the currently set checkpoint) have been processed and the changes documented therein applied to the persistent storage.

Recovery times to restore a system can vary in the system. While checkpointing can reduce recovery times, it can nonetheless result in unacceptable recovery times due to having too many log records or pages to process between checkpoints or lead to overutilization of resources due to checkpointing being performed when a comparatively small number of changes are to be processed. In particular, while checkpointing can reduce recovery times, it also often requires significant resource utilization to read data pages from persistent storage and to apply changes from log records. The use of such resource may be justified when managing recovery times, however when setting a checkpoint would not significantly reduce recovery time, it may be an inefficient use of resources or a use that would take resources away from other operations being performed.

Further, a checkpoint will typically traverse the entire buffer pool looking for dirty pages even if the percentage of dirty pages is small. In large memory systems, the proportion of dirty pages can be much smaller compared to the total buffer pool size.

Further still, the generation of buffered write log records is disabled during the checkpoint duration. If a database were to become inconsistent or crash before the checkpoint completion is noted, there may be no mechanism to detect the write operations that have already been issued to the persistent storage, thereby resulting in unnecessary data page reads during recovery to read data pages from persistent storage that have in fact already had updates from the log records applied to them.

Without any reasonable mechanism to estimate the expected recovery time, auto checkpoints are based on heuristics that are unable to characterize all the different types of workloads. This results in unpredictable recovery performance and makes the 'minimum recovery interval' unreliable.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method practiced in a computing environment. The method includes acts for managing database recovery time. The method includes receiving user input specifying a target recovery time for a database. The method further includes determining an amount of time to read a data page of the database from persistent storage. The method further includes determining an amount of time to process a log record of the database to apply changes specified in the log record to a data page. The method further includes determining a number of dirty pages that presently would be read in recovery if a database failure occurred. The method further includes determining a number of log records that would be processed in recovery if a database failure occurred. The method further includes adjusting at least one of the number of dirty pages that presently would be read in recovery or the number of log records that would be processed in recovery according to the specified target recovery time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
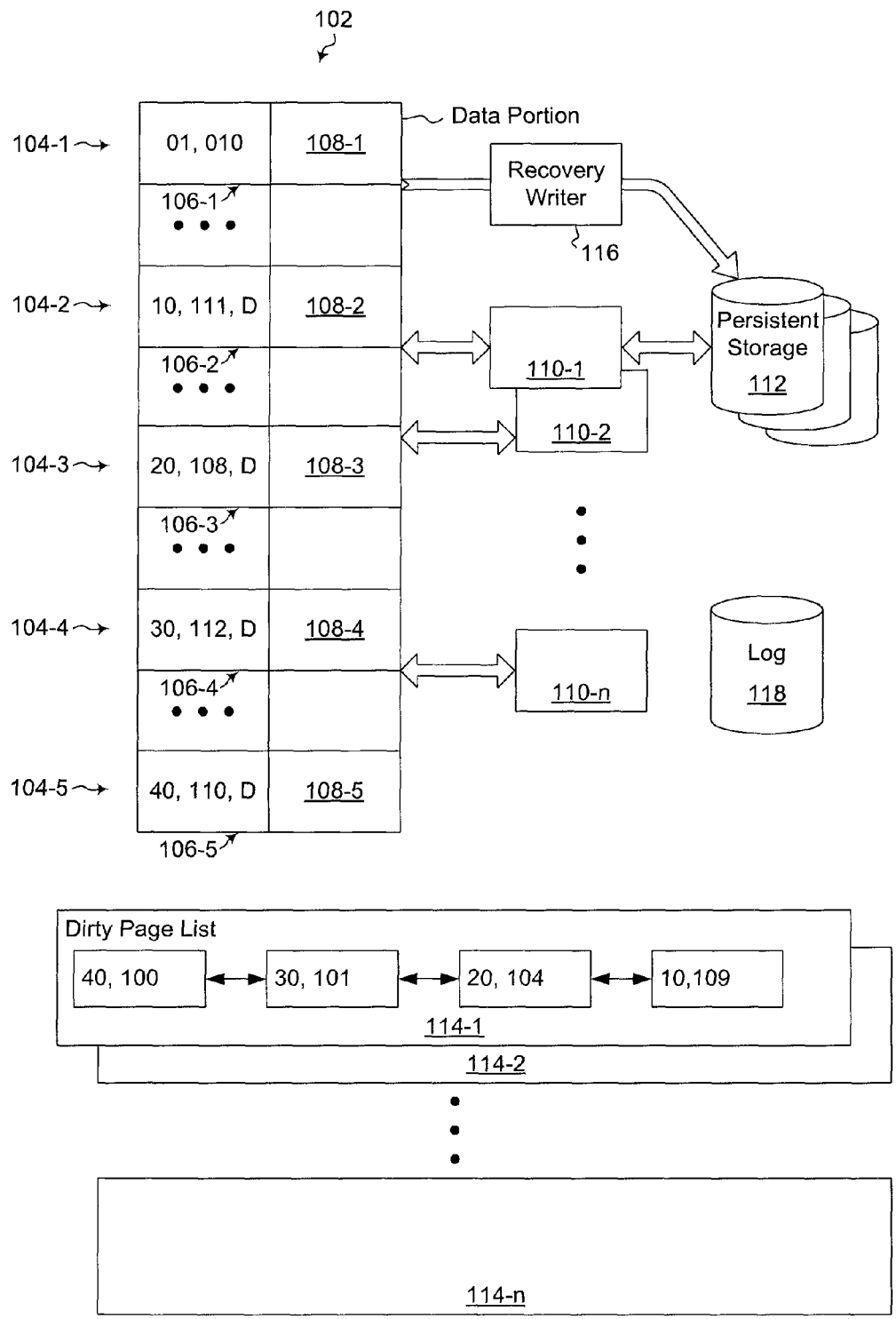
FIG. 1 illustrates portions of a database recovery system.

Some embodiments described herein include functionality for modeling expected recovery time of a database system as a function of a number of dirty pages in the system, an active log size and system IO characteristics. Further in some embodiments, the system IO characteristics may be observed characteristics of the actual system. This model can be used to estimate the recovery time of a database and attempt to guarantee a user specified minimum recovery interval. Some embodiments may be implemented where the minimum recovery interval needs to be specified by a user, without needing to specify parameters such as: (1) an IO target during startup or (2) the bound of the log after the last checkpoint. The IO target is based on the user knowing how the I/O system performs and specifying the amount of I/O that the user is willing to incur during recovery. The bound of the log after the last checkpoint is used to bound the log that should be redone. For the bound of the log after the last checkpoint, the user has to understand the redo speed for their system and set this target. These two settings require the user to understand their environment very well and deduce the values from the desired recovery interval. In contrast, some embodiments herein include functionality where a system can learn similar characteristics dynamically.

Further, embodiments may be implemented to maintain partitioned lists in a first dirtied LSN order, where the first dirtied LSN is the the LSN of the log record which first dirtied the page. Embodiments may use algorithms that can use the partitioned lists without requiring total ordering. Illustratively, each database may maintain a list of dirty buffers. The lists may be sorted in the order of the first dirtied LSN. In the lifetime of a data page in memory multiple changes may be applied to it before it is ever written to persistent storage. The first dirtied LSN represents the earliest of these not yet persisted updates for the page. While conceptually each database can be thought of as having a single list, to avoid contention over a global resource one list may be maintained per processor. Components that use the list may be designed handle the partial ordering.

Embodiments may implement an indirect checkpoint. In particular, periodically the database performs a light-weight indirect checkpoint that records a minimum recovery LSN (i.e. the LSN from where redo should start) using the dirty page lists. However, the indirect checkpoint itself does not perform any page writes but rather is able to optimize recovery by recording the minimum recovery LSN based on writes performed by other mechanisms. Periodically as used herein does not necessarily require, nor exclude, operations being done with a given interval. Rather, periodically may include random or pseudo random time periods; increasing or decreasing time periods, constant interval time periods, or any other appropriate time periods.

Embodiments may be optimized by operating only on dirtied pages. These dirty pages are typically only a small fraction of the total memory, even on very large systems.

Referring now to FIG. 1, an example environment is illustrated. FIG. 1 illustrates a buffer pool 102. The buffer pool 102 stores database pages (referred to herein generally as 104 but with specific examples shown at 104-1, 104-2, 104-3, 104-4, and 104-5) in memory. Each database page is a storage amount of predetermined size configured to store database data. Each page has a header (referred to generally as 106, but shown specifically at 106-1, 106-2, 106-3, 106-4, and 106-5). The header, in the examples shown, stores a page identifier and an LSN. For example, header 106-1 has the page identifier 01 and the LSN 101. The LSN in the header 106 identifies the LSN that made the last or most recent change to the page. The LSN in the header 106 may sometimes be referred to as the pageLSN. As will be illustrated below, this differs from the LSN that is stored in the dirty page lists 114.

The header 104 may also include an indication that a page 104 is dirty. In the examples shown, the header 106 includes a D if the page is dirty. However, in practice, embodiments may have a single dirty bit or other indicator to indicate that a page 104 is dirty. Generally a page 104 in the buffer pool 102 is dirty when it has been written to (i.e. had values in the page changed) after being read from or written to persistent storage 112. In particular, a dirty page 104 in the buffer pool 102 will likely (but not necessarily) be different than the same page stored in persistent storage 112. For example, a page may be dirty, in some embodiments, even though the action causing the page to be dirty includes a value in the page 104 being overwritten with the same value, or a value in a page being written to some other value and then having the value restored to the original value.

Each page also has a data portion, referred to herein generally as 108, but shown specifically at 108-1, 108-2, 108-3, 108-4, and 108-5. The data portion stores database data to be operated on for a database page.

As illustrated, one or more processors (referred to herein generally at 110, but shown specifically at 110-1-110-n) can be used to read data from persistent storage 112 and write the data to the buffer pool 102. Persistent storage 112 may be for example, one or more hard disk drives, one or more flash drives, one or more tape drives, or other storage that can persist data and in particular in some embodiments can persist data without need power to be applied to the persistent storage device to persist the data.

FIG. 1 further illustrates dirty page lists referred to generally as 114, but shown specifically as 114-1 through 114-n, where in this example, n is equivalent to the n used for the processors 110, as will be explained in more detail below.

While the example illustrated shows a non-partitioned buffer pool, it should be appreciated that in other embodiments, the buffer pool itself may be partitioned, for example in case of Non Uniform Memory Access (NUMA) machines. Embodiments herein can function well with NUMA machines.

In the illustrated example, each physical recovery unit maintains a list of dirty buffers linked in ascending order of their FirstDirtiedLSN. When a clean buffer is dirtied by a page operation, the corresponding LSN is marked as the FirstDirtiedLSN of the page 104. Successive updates to the page update the pageLSN in the header 106, but do not affect the FirstDirtiedLSN included in the dirty page list 114. Clean buffers do not have a FirstDirtiedLSN associated with them. When a dirty buffer is persisted in persistent storage 112, this FirstDirtiedLSN value is reset to NULL.

Unlike the pageLSN, FirstDirtiedLSN is applicable while the page is dirty in the buffer pool, and therefore it does not need to be persisted. Each buffer header 106 contains the value of the FirstDirtiedLSN associated with the buffer page 104; this value is set when the buffer page 104 is first modified and inserted to a dirty page list 114.

While conceptually one may conceptualize a single dirty page list for a physical recovery unit, maintaining one dirty page list may introduce a bottleneck. Therefore some embodiments may be implemented where the dirty page lists 114 are partitioned such that one dirty page list 114 is maintained per processor 110. In some embodiments, each dirty page list 114 is protected by a separate spinlock. The thread (or processor 110) that dirties a clean buffer page 104 and updates the FirstDirtiedLSN, adds a buffer entry to the list associated with its processor 110. Adding a buffer entry may include adding the buffer entry into the appropriate location in a dirty page list 114 and linking the buffer entry appropriately (i.e. in order) to other buffer entries. When a page 104 is written to persistent storage 112, the buffer entry is removed from the appropriate list.

The following illustrates various processes. Processes described below are designed such that they do not require constructing a single dirty page list 114 out of the multiple dirty page lists or seeing a consistent view of the dirty page lists (which would likely include periodically blocking changes to the lists).

As illustrated in FIG. 1, the FirstDirtiedLSN is maintained in a buffer entry structure. In the illustrated example, the buffer entry structure, as shown in FIG. 1, also maintains links to neighboring buffer entries in a dirty page list 114. However, this is not required. In particular, in one example, the structure that maintains the FirstDirtied LSN and the links to the next entry in the dirty page list can be outside the buffer entry structure and the buffer entry structure may only have a reference to this external In some embodiments, partitioning the dirty page lists 114 is achieved by maintaining one list for every primary scheduler, where a given primary scheduler is responsible for scheduling work for a given processor. Each list is protected by a spinlock. Hidden schedulers are used as additional schedulers that are used to schedule and control processor time slices for internal/background tasks. Having these background tasks be scheduled independently on separate schedulers ensures that they do not contend (and starve) for resources with the user activity. Hidden schedulers use the list associated with the primary scheduler associated with the processor 110 on which the current worker is running.

A worker that dirties a clean buffer and updates the FirstDirtiedLSN, adds the buffer entry to the dirty page list 114 associated with its scheduler.

After the page is written to persistent storage, the buffer entry is removed from its corresponding dirty page list 114 by the worker that processes the IO completion. Inasmuch as IO completion is processed during context switches, list access may be synchronized using a non-suspending synchronization object, such as a spinlock.

Embodiments may implement and utilize checkpoints and indirect checkpoints. Checkpoints, in some embodiments, operate as follows: (1) Embodiments, write a begin checkpoint log record marking the start of the checkpoint. The LSN associated with the begin checkpoint log record is the CheckpointLSN. The log 118 is flushed up to the CheckpointLSN. (2) Embodiments may perform a cache flush. This may include flushing dirty data pages in the buffer pool 102. A random walk of the buffer pool is performed to locate and write all the dirty pages dirtied before the checkpoint started. (3) Embodiments may take into account active transaction information. Log records that contain information about active transactions are generated. These are used by analysis to construct a transaction table. (4) Embodiments may then flush Delta counts, commit table contents etc. (5) Embodiments may write a log record marking the end of the checkpoint. This log record notes the CheckpointLSN and the MinRecoveryLSN. The MinRecoveryLSN is the minimum value of the FirstDirtiedLSN amongst the buffer entries in all the dirty page lists 114. The MinRecoveryLSN is currently set to the CheckpointLSN because the logic in the cache flush step ensures that there are no log records before the CheckpointLSN that need to be redone. Analysis starts at the MinRecoveryLSN. The active transaction information recorded in the log 118 can be used to obtain information about transactions that may have started before the MinRecoveryLSN without actually having to scan the log 118 since the oldest active transaction. (6) Embodiments may write the CheckpointLSN to the database boot page. (7) Log Truncation LSNs are updated to reflect the successful checkpoint.

Some embodiments may implement an indirect checkpoint. An indirect checkpoint is a light-weight checkpoint that does not write pages or changes to persistent storage, but records information identifying an oldest dirty page. For an indirect checkpoint, a cache flush does not write the dirty pages. Instead it computes the MinRecoveryLSN which is the earliest log record from which analysis and redo phases of recovery should begin scanning the log 118. MinRecoveryLSN is the minimum value of FirstDirtiedLSN amongst the dirty buffers in the dirty page lists in the physical recovery unit. Indirect checkpoint embodiments may be implemented where the end checkpoint log record will note this MinRecoveryLSN separately from the CheckpointLSN inasmuch as both will be used during the analysis phase. Indirect checkpoint embodiments may be implemented where both the MinRecoveryLSN and the CheckpointLSN are written separately to the boot page. Indirect checkpoint embodiments may be implemented where the MinRecoveryLSN can be earlier than the CheckpointLSN, therefore log truncation can be gated by the minimum of these values.

Inasmuch as in some embodiments the page operation log record is generated before updating the pageLSN and marking the page dirty, embodiments may have pages that have generated a log record but have not been marked dirty and as such are not inserted in the dirty page list. Computation of MinRecoveryLSN may be implemented to not miss such pages as it would skip updates to these pages during recovery.

This is achieved as follows: While dirtying a buffer the following steps are followed: (1) a buffer entry in the dirty page list 114 is prepared to made dirty. This is done by (a) setting the checkpoint generation and (b) adding the buffer entry to the head of the dirty page list 114 with FirstDirtiedLSN set to NullLSN. (2) The pageLog record is generated and a page 104 is modified. (3) the buffer entry is made to indicate a page 104 is dirty. Before the page is marked dirty, FirstDirtiedLSN is set to the pageLSN from step 2 and the buffer entry is moved within the dirty page list 114 to maintain sorted order. This may be out under the dirty page list 114 spinlock.

A checkpoint thread, in some embodiments, computes the MinRecoveryLSN as follows: (1) If there is any buffer entry in the dirty page list 114 for which FirstDirtiedLSN is NullLSN and was dirtied in the older checkpoint generation, then the checkpoint Thread waits for an update latch on the buffer. An update mode latch ensures that while other threads may read the page, no other entity may modify the page. (2) Once all the buffer entries are either dirtied in the new checkpoint generation or have a valid FirstDirtiedLSN, MinRecoveryLSN is computed as the minimum value of the FirstDirtiedLSN amongst the buffer entries in all the dirty page lists 114

Embodiments may include functionality for estimating and limiting recovery time. Database recovery may include three phases, namely analysis, redo and undo. The undo phase is further divided in to undoing system transactions and subsequently undoing user transactions. In some embodiments, the database is unavailable until system transaction undo completes. The database is made available for user connections while undo runs concurrently. Inasmuch as system transactions are infrequent and short, the system transaction undo may be near instantaneous. Therefore delay in database availability is largely determined by the time taken by the analysis and the redo phases.

The analysis phase, in the illustrated example, includes a pass that makes a sequential scan of the log 118 and builds in-memory data structures such as the dirty page table and the transaction table that are used during the subsequent recovery passes. Embodiments may be implemented under the assumption that the time spent in analysis is largely determined by the time required for the sequential IO of the active portion of the log 118.

The redo phase includes a pass that reads a set of data pages from persistent storage 112 into the buffer pool 102 using small random IOs. The time required for the redo phase depends on how efficiently all the affected data pages are read in from the persistent storage 112. The redo pass also accesses the same section of the log 118 as read by the analysis phase. In some embodiments, the IO for log reads does not need to be accounted for because: (a) if the log 118 and data are on separate persistent storage devices (which is commonly the case), log IO cost is masked by the cost of reading in dirty pages and (b) The tail of the log 118 read during analysis phase may be cached for re-use during redo.

The recovery time of a database can be approximately estimated as follows:

$$\text{recovery time} = \left(\frac{\text{Size of the active log}}{\text{Disk bandwidth}}\right) + \left(\frac{\text{\# maximum distinct random data } IOs \text{ from a single disk}}{\text{Latency for random } IOs}\right)$$

Embodiments may be optimized where the following are true or at least approximately true. The size of the active log 118 to be scanned during recovery is much larger than the span of the typical transaction's footprint in the log 118. This is often true for typical on-line transaction processing workloads where most of the transactions are short. Page writes are recorded in the log 118 and can be discovered in the analysis pass. In some embodiments, the page write log records are generated for a set of pages with a FlushLSN corresponding to the oldest page write. This may incur wasted page reads for some pages during recovery. Some embodiments ignore this inaccuracy while estimating the threshold for limiting the dirty pages.

In some embodiments, data of the database and the log 118 log are assumed to be on separate persistent storage devices as illustrated in FIG. 1. If there are multiple data files in a database, some embodiments may assume that they are on separate storage devices as illustrated by the multiple storage devices included in the persistent storage 112 in FIG. 1. Embodiments can be extended to detect co-located files using file system APIs. Data layout in a database may be known (or can be made known) to the system depending on the type of database used. Embodiments may be implemented where data is substantially uniformly distributed across the files involved. However, alternative embodiments may be implemented where data is not as uniformly distributed across files involved by computing heuristics based on average measurement across all files.

As seen above, the dirty page lists 114 have the dirty buffers and their respective FirstDirtiedLSN for the RecoveryUnit. At a given time MinrecoveryLSN is the minimum FirstDirtiedLSN of all the dirty buffers. Issuing page writes in the ascending order of the FirstDirtiedLSN, ensures that MinRecoveryLSN keeps advancing thereby limiting the amount of redo required.

When a database is enabled for fast recovery, a fast recovery writer 116 continuously writes dirty pages in the background using available computing resources so as to limit the redo work during recovery. The fast recovery writer 116 in combination with use of the indirect checkpoint can help reduce recovery time as illustrated above.

The pace of background writes by the fast recovery writer 116 can be adapted to increase the rate of background writes or decrease the rate of background writes. For example, the fast recovery writer 116 can be adapted to increase the rate of background writes when there is an increase in rate at which pages 104 are dirtied. In another example, the fast recovery writer 116 can be adapted to increase the rate of background writes when the rate of increase of the active portion of the log 118 is significantly more than the ability to advance the MinRecoveryLSN using background writes. The fast recovery writer 116 can be adapted to decrease the rate of background writes to conserve system resources when there is a decrease in rate at which pages 104 are dirtied. The fast recovery writer 116 can be adapted to decrease the rate of background writes when the rate of increase of the active portion of the log 118 is significantly less than the ability to advance the MinRecoveryLSN using background writes.

Embodiments may include functionality for estimating the time spent in an analysis phase. The following illustrates a sample formula that may be used to estimate time spent in the analysis phase:

$$AnalysisTime = \frac{SpaceBetween(MinRecoveryLSN, EndOfLogLSN)}{LogProcessingRate}$$

To simplify the model, embodiments may assume that a fixed amount of work is done per byte of log 118 that has to be processed during the analysis phase. Therefore LogProcessingRate can be computed for example, by assuming that the analysis pass is limited by IO operations to persistent storage and thus use the sequential bandwidth observed during runtime as the expected log processing rate. In alternative embodiments, embodiments can use the measurements of analysis time and log bytes processed from a previous recovery to estimate the log processing rate. Combinations of these or other estimating methods may be used additionally or alternatively.

Embodiments may include functionality for determining the number of data IOs that can be issued during a redo phase. The following illustrates an example formula that may be used for such a determination:

$$MAX\_DATA\_READS = \frac{RecoveryInterval - AnalysisTime}{Average\ Read\ IO\ Latency}$$

In some embodiments, the average read IO latency is computed or determined using observed IO statistics. For example, information about observed IO characteristics such as average read latency, average write latency, average I/O queue length, etc. may be maintained for each of the data files. However, it should be noted that these are just examples and alternative or additional such metrics/characteristics can be used. Embodiments may implement statistical sampling of the IO latencies to ensure accurate characterization of the expected read latency during redo.

Embodiments may include functionality for accounting for multiple storage devices. In a well configured system, the data layout may be planned so that the IOs are spread around uniformly across the multiple persistent storage devices, such disks or logical unit numbers (LUNs). Therefore with appropriate read-ahead, embodiments can assume that embodiments can issue parallel reads on the multiple storage devices during redo. Thus, when using multiple storage devices, the MAX_DATA_READS parameter computed above can be adjusted to account for multiple storage devices. The following illustrates an example formula that can be used to account for multiple storage devices:

MAX_DATA_READS=MAX_DATA_READS*#StorageDevices*DampingFactor

The DampingFactor accounts for non ideal data layout and also read ahead inaccuracy because of limited memory availability. In one embodiment, the DampingFactor is predetermined and set to 0.6. However other DampingFactors may be used. In particular, some embodiments may be able to determine the DampingFactor based on boundaries of growth for a database. In particular, when database size on the persistent storage 112 is increased, it is often increased based on a predetermined amount. While increasing by a predetermined amount makes for faster page reads by using sequential type IOs to the persistent storage, the size of growth causes pages to be stored where random IOs are used at the boundaries of database growth. The DampingFactor can be used to account for these boundaries, or for other factors that reduce data reading ability.

Embodiments may include functionality for translating MAX_DATA_READS to pages to be written by the recovery writer 116. In some embodiments, when the fast recovery writer 116 writes dirty pages to disk, it maintains counters that aggregate the number of pages written and the number of IOs issued. In some embodiments, this information can be used to determine a contiguity factor. For example, such a contiguity factor may be calculated as:

$$ContiguityFactor = \frac{\#pageswritten}{\#distinctIOsIssued}$$

Recovery time in a database, in some embodiments, can be limited by ensuring that dirty pages in the system is limited as follows:

MAX_DIRTY_PAGES=MAX_DATA_READS*ContiguityFactor*DampingFactor

Once MAX_DIRTY_PAGES has been determined, embodiments may include functionality for determining the number of pages to write. In the following illustration, D(t)= Number of dirty extents at time t, T=Time between successive executions of the FastRecoveryWriter cycle, [D(t)−D(t−T)] is the number of pages that have been dirtied since the last time the FastRecoveryWriter was run, and α is the pacing factor set to 0.25. The following pseudocode illustrates a method of determining the number of pages to write:

```
if (D(t) < MinThresholdToInitiateFastRecWrites *
MAX_DIRTY_PAGES)
{
    // Do nothing during the current cycle
}
//If the number of dirty pages in the system are lower
than a certain threshold percentage of the target,
then there is no need to issue background writes.
else if (D(t) <
ThresholdForSlowPaceFastRecoveryWrites *
```

-continued

```
MAX_DIRTY_PAGES)
{
    IssueWrites ((1- α) * [D(t) – D(t – T)]);
}
//This issues writes for slow paced background writes.
else if (D(t) <
ThresholdForNormalPaceFastRecoveryWrites *
MAX_DIRTY_PAGES)
{
    IssueWrites ([D(t) – D(t –T)]);
}
//This issues writes for normal paced background
writes.
else
{
    IssueWrites ((1 + α) * [D(t) – D(t –T)])
}
//This issues background writes aggressively to catch-
up.
```

As noted, some embodiments may include multiple dirty page lists 114 correlated to multiple processors 116. Therefore, some embodiments may include functionality for distributing page writes across multiple dirty page lists. These IOs are issued in the LSN order to advance the MinRecLSN and reduce the amount of log 118 that would need to be processed during recovery. Inasmuch as some embodiments expect that information about the dirty pages would be more or less uniformly spread across the various dirty page lists 114, these page IOs may be distributed across the various dirty page lists 114 without actually linearly sorting the dirty pages in strict LSN order.

In some embodiments, a routine that computes the MinRecLSN from these dirty page lists, remembers the list that contributed to the MinRecLSN (i.e. has the oldest buffer entry). While distributing page IOs across the various dirty page lists 114, the dirty page list 114 that contributed to the MinRecLSN may be trimmed more aggressively than the others.

Recovery time may be reduced by flushing dirty pages in the system thereby providing an upper bound on the amount of work done during a subsequent crash recovery. Alternatively or additionally, recovery time may be reduced by writing dirty pages in FirstDirtiedLSN order hence reducing the amount of log 118 that needs to be analyzed/processed during recovery.

The MinRecLSN which is the minimum of FirstDirtiedLSNs of all dirty buffers is advanced when an indirect checkpoint is issued. The page IOs may be issued much more frequently than the frequency of an indirect checkpoint.

Forced writes write a data page no matter what, while best effort writes determine if the page is in use by another transaction and skip the page and re-visit the page later when it is no longer in use. Forced writes can have adverse impact on the throughput as the transaction waits for the IO to complete. Between two successive indirect checkpoints, forced writes, in some embodiments, may not provide any advantage. Therefore in some embodiments, the fast recovery writer 116 typically uses best effort writes. However, one exception is when MinRecLSN can be advanced significantly by forcing the dirty page to disk.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
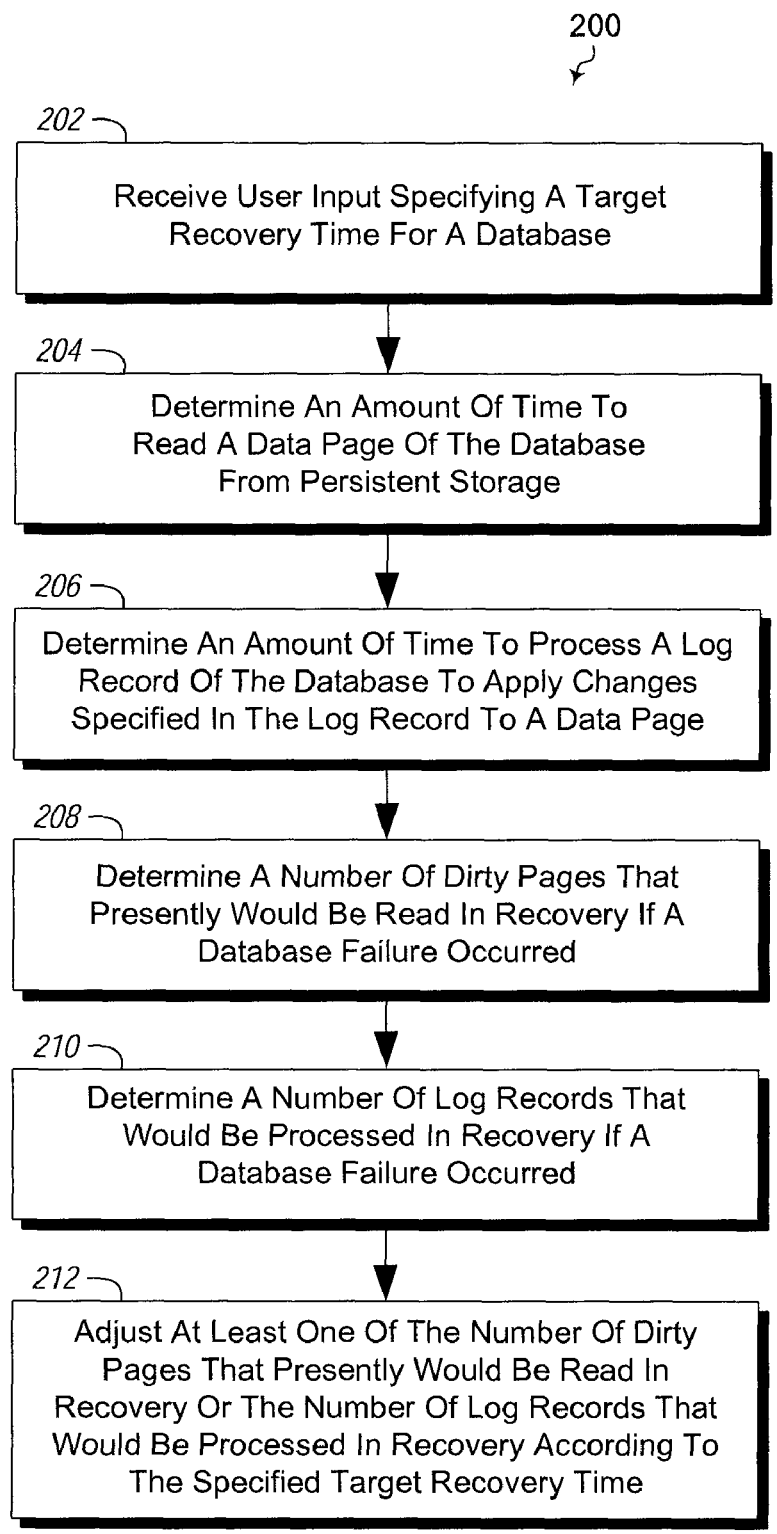
FIG. 2 illustrates a method of managing database recovery time.

Referring now to FIG. 2, a method 200 is illustrated. The method may be practiced in a computing environment. The method includes acts for managing database recovery time. The method identifying a target recovery time for a database. For example, user input may be received specifying a target recovery time. This may be a time that a user determines that they want database to be able to recover in. Some embodiments may be practiced where receiving user input specifying a target recovery time for a database is done without receiving additional user input specifying an IO target during startup or the bound of the log after the last checkpoint.

The method 200 further includes determining an amount of time to read a data page of the database from persistent storage. For example, embodiments may implemented where determining an amount of time to read a data page of the database from persistent storage is based on historically observed IO characteristics for persistent storage of the database. For example, as illustrated above, this may be based on sequential bandwidth observed during runtime as the expected log processing rate. Alternatively, this may be based on measurements of analysis time and log bytes processed from a previous recovery to estimate the log processing rate.

The method 200 further includes determining an amount of time to process a log record of the database to apply changes specified in the log record to a data page.

The method 200 further includes determining a number of dirty pages that presently would be read in recovery if a database failure occurred. For example, in some embodiments, this can be determined by examining the dirty page lists 114 to determine the number of dirty pages in the buffer pool. Alternatively, embodiments can identify indicators in the buffer pool 102 indicating dirty pages such that the number of dirty pages can be identified.

The method 200 further includes determining a number of log records that would be processed in recovery if a database failure occurred. For example, embodiments may examine a log 118 to determine how many log records need to be applied in a recovery scenario at a given time. Based on the number of log records, and the amount of time to apply a record, a time to apply all outstanding log records can be identified or determined.

The method 200 further includes adjusting at least one of the number of dirty pages that presently would be read in recovery or the number of log records that would be processed in recovery according to the identified target recovery time. For example, this can be done by increasing background writes or decreasing background writes to try to approach a target recovery time.

The method 200 may be practiced where determining a number of dirty pages that presently would be read in recovery if a database failure occurred, determining a number of log records that would be processed in recovery if a database failure occurred and adjusting at least one of the number of dirty pages that presently would be read in recovery or the number of log records that would be processed in recovery according to the specified target recovery time are repeated on an on-going basis to attempt to maintain a desired recovery time over a period of database operation.

As noted above, the method 200 may be practiced where determining a number of dirty pages that presently would be read in recovery is determined based on one or more dirty page lists. For example, dirty page lists 114 can be used to determine a number dirty pages to be read in recovery. In some embodiments, the one or more dirty page lists are maintained based a light-weight checkpoint that does not write pages or changes to persistent storage, but records information identifying an oldest dirty page. The indirect checkpoint illustrated above illustrates an example of such a light-weight checkpoint.

Embodiments may be practiced where the one or more dirty page lists are maintained on a per scheduler basis. Each scheduler is associated with one or more processors. In some embodiments it may be useful to avoid having threads running concurrently on multiple processors to be bottlenecked on a single common resource. Therefore embodiments may maintain one list per processor. For some embodiments, the database engine has one (logical) scheduler per CPU. Thus, these embodiments may maintain a dirty page list per scheduler.

The method 200 may be practiced where adjusting at least one of the number of dirty pages that presently would be read in recovery or the number of log records that would be processed in recovery according to the specified target recovery time is based on the number of persistent storage devices in the database. An example is illustrated above, where embodiments use the #StorageDevices variable in calculations.

The method 200 may be practiced where adjusting at least one of the number of dirty pages that presently would be read in recovery or the number of log records that would be processed in recovery according to the specified target recovery time is based on a contiguity factor. The contiguity factor is based on database growth size which determines a quantity of data pages that can be read from persistent storage in a sequential read fashion. An example is illustrated above, where embodiments use the ContiguityFactor variable in calculations.

The method 200 may be practiced where adjusting at least one of the number of dirty pages that presently would be read in recovery or the number of log records that would be processed in recovery includes writing pages to persistent storage using best effort writes. As noted above, in some embodiments it may be preferable to favor best effort writes as opposed to forced writes. This can help to reduce impact on throughput for user transactions.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer. Physical computer readable storage media, as used herein, however specifically excludes propagated signals.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of managing database recovery time, the method comprising:
   (a) receiving user input specifying a target recovery time for a database;
   (b) determining an amount of time to read a data page of the database from persistent storage;
   (c) determining an amount of time to process a log record of the database to apply changes specified in the log record to a data page;
   (d) determining a number of dirty pages that presently would be read in recovery if a database failure occurred, wherein a list of dirty pages is contained within one or more dirty page lists, each dirty page list comprising a page identification (pageID) for each of one or more dirty pages and an associated first dirtied log sequence number (firstDirtiedLSN) and wherein each data page is identified by a pageID, an indication of whether or not it is a dirty page, and a page log sequence number (pageLSN) corresponding to a log entry corresponding to a most recent change to the each data page;
   (e) determining a number of log records that would be processed in recovery if a database failure occurred;
   (f) adjusting at least one of the number of dirty pages that presently would be read in recovery or the number of log records that would be processed in recovery according to the specified target recovery time, wherein adjusting at least one of the number of dirty pages that presently would be read in recovery or the number of log records that would be processed in recovery according to the specified target recovery time is based on a contiguity factor, wherein the contiguity factor is based on database growth size which determines a quantity of data pages that can be read from persistent storage in a sequential read fashion.

2. The method of claim 1, wherein acts (d), (e), and (f) are repeated on an on-going basis to attempt to maintain a desired recovery time over a period of database operation.

3. The method of claim 1, wherein determining a number of dirty pages that presently would be read in recovery is determined based on the one or more dirty page lists.

4. The method of claim 3, wherein the one or more dirty page lists are maintained based a light-weight checkpoint that does not write pages or changes to persistent storage, but records information identifying an oldest dirty page.

5. The method of claim 3, wherein the one or more dirty page lists are maintained on a per scheduler basis.

6. The method of claim 1, wherein receiving user input specifying a target recovery time for a database is done without receiving additional user input specifying an IO target during startup or a bound of a log after a last checkpoint.

7. The method of claim 1, wherein determining an amount of time to read a data page of the database from persistent storage is based on observed IO characteristics for persistent storage of the database.

8. The method of claim 1, wherein adjusting at least one of the number of dirty pages that presently would be read in recovery or the number of log records that would be processed in recovery according to the specified target recovery time is based on the number of persistent storage devices in the database.

9. The method of claim 1, wherein adjusting at least one of the number of dirty pages that presently would be read in recovery or the number of log records that would be processed in recovery comprises writing pages to persistent storage using best effort writes.

10. One or more physical computer readable storage media comprising computer executable instructions that when executed by one or more processors cause the following to be performed:
    (a) identifying a target recovery time for a database;
    (b) determining an amount of time to read a data page of the database that has been stored persistently;
    (c) determining an amount of time to process a log record of the database to apply changes specified in the log record to a data page;
    (d) determining a number of dirty pages that will have to be read in recovery if a database failure occurred, wherein a list of dirty pages is contained within one or more dirty page lists, each dirty page list comprising a page identification (pageID) for each of one or more dirty pages and an associated first dirtied log sequence number (firstDirtiedLSN) and wherein each data page is identified by a pageID, an indication of whether or not it is a dirty page, and a page log sequence number (pageLSN) corresponding to a log entry corresponding to a most recent change to the each data page;
    (e) determining a number of log records to be processed in recovery;
    (f) adjusting at least one of the number of dirty pages that presently would be read in recovery or the number of log records that would be processed in recovery according to the identified target recovery time, wherein adjusting at least one of the number of dirty pages that presently would be read in recovery or the number of log records that would be processed in recovery according to the specified target recovery time is based on a contiguity factor, wherein the contiguity factor is based on database growth size which determines a quantity of data pages that can be read from persistent storage in a sequential read fashion.

11. The one or more physical computer readable storage media of claim 10, wherein acts (d), (e), and (f) are repeated on an on-going basis to attempt to maintain a desired recovery time over a period of database operation.

12. The one or more physical computer readable storage media of claim 10, wherein determining a number of dirty pages that will have to be read in recovery if a database failure occurred is determined based on one or more dirty page lists.

13. The one or more physical computer readable storage media of claim 12, wherein the one or more dirty page lists are maintained based a light-weight checkpoint that does not write pages or changes to persistent storage, but records information identifying an oldest dirty page.

14. The one or more physical computer readable storage media of claim 12, wherein the one or more dirty page lists are maintained on a per scheduler basis.

15. The one or more physical computer readable storage media of claim 10, wherein determining an amount of time to read a data page of the database that has been stored persistently is based on observed IO characteristics for persistent storage of the database.

16. The one or more physical computer readable storage media of claim 10, wherein adjusting at least one of the number of dirty pages that presently would be read in recovery or the number of log records that would be processed in recovery according to the specified target recovery time is based on the number of persistent storage devices in the database.

17. The one or more physical computer readable storage media of claim 10, wherein adjusting at least one of the number of dirty pages that presently would be read in recovery or the number of log records that would be processed in recovery preferring to write pages to persistent storage using best effort writes.

18. In a computing environment, a system configured to manage database recovery time, the system comprising:
- one or more processors;
- one or more physical computer readable media coupled to the one or more processors, wherein at least a portion of the one or more physical computer readable media comprises persistent storage for storing database pages and persistent storage for storing a log storing changes to the database;
- a computer module implementing a buffer pool in at least a memory portion of the one or more physical computer readable media, the buffer pool being configured to store database pages read from the persistent storage for storing database pages into the memory portion, wherein database data page is identified by a pageID, an indication of whether or not it is a dirty page, and a page log sequence number (pageLSN) corresponding to a log entry corresponding to a most recent change to the each data page;
- a computer module implementing one or more dirty page lists, the number of dirty page lists corresponding to a number of processors included in the system, the dirty page lists identifying pages in the buffer pool that have been modified, each dirty page list comprising a page identification (pageID) for each of one or more dirty pages and an associated first dirtied log sequence number (firstDirtiedLSN);
- a computer module implementing a recovery writer configured to write dirty pages from the buffer pool to the persistent storage for storing database pages; and
- a computer module configured to adjust a number of dirty pages that would be read in recovery or a number of log records that would be processed in recovery according to an identified target recovery time, wherein adjusting at least one of the number of dirty pages that presently would be read in recovery or the number of log records that would be processed in recovery according to the specified target recovery time is based on a contiguity factor, wherein the contiguity factor is based on database growth size which determines a quantity of data pages that can be read from persistent storage in a sequential read fashion.

* * * * *